United States Patent
Rosenberg

[11] 3,714,274
[45] Jan. 30, 1973

[54] PROCESS FOR PREPARING BROMOPHENYL NORBORNENES

[75] Inventor: David S. Rosenberg, Niagara Falls, N.Y.

[73] Assignee: Hooker Chemical Corporation, Niagara Falls, N.Y.

[22] Filed: June 29, 1970

[21] Appl. No.: 51,010

[52] U.S. Cl............260/649 R, 252/8.1, 260/611 A, 260/45.7 R, 260/649 F, 260/880, 260/DIG. 24
[51] Int. Cl.............................................C07c 25/18
[58] Field of Search........260/649, 649 F, 650, 611 A

[56] References Cited

UNITED STATES PATENTS

| | | | |
|---|---|---|---|
| 3,285,965 | 11/1966 | Jenkner | 260/649 R |
| 3,170,961 | 2/1965 | Britton et al. | 260/650 R |
| 2,607,802 | 8/1952 | Britton et al. | 260/650 R X |

FOREIGN PATENTS OR APPLICATIONS

| | | | |
|---|---|---|---|
| 860,198 | 12/1952 | Germany | 260/650 R |
| 991,067 | 5/1965 | Great Britain | 260/649 |
| 986,634 | 3/1965 | Great Britain | 260/650 R |

OTHER PUBLICATIONS

Williamson et al., J.A.C.S. 86, 4021–4025. 1964

*Primary Examiner*—Howard T. Mars
*Attorney*—Peter F. Casella, Donald C. Studley, Richard P. Mueller, James F. Mudd and William J. Schramm

[57] ABSTRACT

Bromophenyl norbornenes are prepared by brominating a compound of the formula

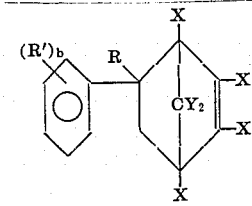

with a mixture of bromine and chlorine in the presence of an antimony catalyst; wherein X is a halogen independently selected from the group consisting of fluorine, chlorine, bromine; Y is independently selected from the group consisting of fluorine, chlorine, bromine, alkyl of one to 10 carbon atoms, alkoxy of one to 10 carbon atoms, monohaloalkyl of one to 10 carbon atoms, wherein said halo is bromine, chlorine, or fluorine; R and R' are independently selected from the group consisting of hydrogen and alkyl of one to six carbon atoms; $b = 0$ or 1. The resulting compounds are useful as fire retardant additives.

12 Claims, No Drawings

PROCESS FOR PREPARING BROMOPHENYL NORBORNENES

BACKGROUND OF THE INVENTION

In the conventional procedures for preparation of brominated organic compounds by nuclear substitution of hydrogen with bromine, the parent compound is reacted with elemental bromine in the presence of a suitable catalyst such as iodine or anhydrous ferric chloride. Only half of the bromine reacted is present in the organic compound, with the other half forming hydrogen bromide as an undesirable by-product. These catalysts also promote secondary reactions, resulting in by-products which contaminate and discolor the product.

Bromophenyl norbornenes are of particular value in the formulation of fire-retardant polymeric compositions. The processing techniques employed and the properties needed for these compositions require that the brominated additive have excellent stability and color. Contaminants which promote decomposition, such as iron compounds, must be excluded. The purification of the product made with the conventional catalyst systems is a difficult and costly procedure.

It is the object of the present invention to produce bromophenyl norbornenes by a simple and economic process.

It is also an object to produce the desired product in high yields and with efficient utilization of bromine in the product. It is a further object to employ a catalyst which does not impart undesirable characteristics to the product. Other objects will be obvious as one of skill in the art reads the specification.

SUMMARY OF THE INVENTION

Bromophenyl norbornenes are prepared by reacting the Diels-Alder adduct of a styrene and a halocyclopentadiene with a brominating agent which is a mixture of bromine and chlorine in the presence of an antimony catalyst. The resulting material is a white crystalline substance. The use of the antimony catalyst results in a simple process for obtaining the desired product in high yields.

DESCRIPTION OF PREFERRED EMBODIMENTS

Bromophenyl norbornenes of the structure

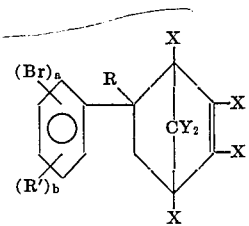

are prepared by a process comprising the steps:

1. reacting a styrene halocyclopentadiene of the structure

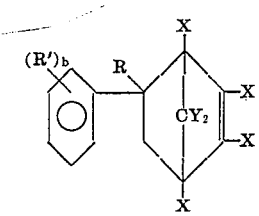

with a brominating agent which is a mixture of bromine and chlorine in the presence of an antimony catalyst; and 2. recovering the desired product; wherein X is a halogen independently selected from the group consisting of fluorine, chlorine and bromine; Y is independently selected from the group consisting of fluorine, chlorine, bromine, alkyl of one to 10 carbon atoms, preferably alkyl of one to six carbon atoms, alkoxy of one to 10 carbon atoms, preferably alkoxy of one to six carbon atoms, monohalo alkyl of one to 10 carbon atoms, preferably monohalo-alkyl of one to six carbon atoms wherein said halo- is fluorine, chlorine or bromine; R and R' are independently selected from the group consisting of hydrogen and lower alkyl of one to six carbon atoms; $a$ ranges from about 2 to 4; $b = 0$ to 1.

The temperature employed in the bromination step ranges from about $-10°C$ to about $150°C$., preferably from about $0°$ to $80°C$., and even more preferably from about $10°$ to about $40°C$. A cool reaction temperature is desired to promote a high yield of aromatic tetrabromo product. However because refrigeration costs are high, a temperature of about $25°C$ is preferred for economic reasons.

In the bromination reaction, an antimony catalyst is employed, such as the metal itself. In addition, other antimony compounds may be employed such as antimony trichloride, antimony pentachloride, antimony tribromide or antimony pentabromide. The preferred catalyst is antimony chloride. The amount of halogenation catalyst employed, on a weight percentage basis of the amount of adduct reactant, ranges from about 0.01 percent to about 10.0 percent.

Solvents may be employed in the halogenation step if desired. The criterion for a solvent is that it be inert to the reactants and the reaction products. Such solvents are halogenated aliphatics of 1 to 6 carbon atoms, such as, acetylene tetrachloride, trichloromethane, hexachlorobutadiene, methylene chloride, chloroform and carbon tetrachloride, etc.

The amount of bromination reagent ranges from about 1 to about 8 moles per mole of adduct, preferably about 3 to about 6 and even more preferably about 4 to about 4.5 per mole of adduct. The amount of bromination agent employed varies with the amount of bromine desired on the aromatic ring.

When the mixture of bromine and chlorine is employed as a bromination agent, the ratios that may be employed are from 0.5 to about 2 moles of bromine per mole of chlorine, preferably equimolar and even more preferably an excess of chlorine, i.e., about 1 mole of bromine per 1.1 moles of chlorine.

Utilizing this bromination technique, the resulting product contains bromine and chlorine substituted on the benzene ring. Generally about 10 percent to about 20 percent of the product will contain 3 bromine atoms and 1 chlorine atom substituted on the benzene ring with the rest of the product (about 80 to about 90 percent) being tetrabrominated products. Other by-products may also be produced in minor amounts, such as, the tribromodichloro isomer.

The most preferred halocyclopentadiene is hexachlorocyclopentadiene while the preferred styrene compound is styrene itself. In order to simplify discussion, reference will be made to the latter two compounds; however, it is recognized that other halogenated cyclopentadienes or styrene derivatives could be a respective component in the Diels-Alder reaction to prepare the reactant for the present bromination invention.

Some of the halogenated cyclopentadienes falling within this invention are as follows: hexahalocyclopentadienes, such as hexachlorocyclopentadiene, hexafluorocyclopentadiene, hexabromocyclopentadiene, etc; monoalkyl pentahalocyclopentadienes, such as, 5-methylpentachlorocyclopentadiene; 5-methylpentabromocyclopentadiene; 5-hexylpentafluorocyclopentadiene; 5-decylpentachlorocyclopentadiene; dialkyltetrahalocyclopentadienes, such as 5,5-dimethyltetrachlorocyclopentadiene; 5,5-dibutyl tetrachlorocyclopentadiene; 5,5-dihexyl tetrabromocyclopentadiene; 5,5-dinonyltetrafluorocyclopentadiene; 5,5-didecyl tetrachlorocyclopentadiene; alkoxy tetrahalocyclopentadienes, such as, 5-methoxy pentachloro or 5,5-dimethoxy tetrachlorocyclopentadiene; 5-hexyloxy pentachloro or 5,5-dihexyloxy tetrabromocyclopentadiene; 5-decyloxy pentachloro or 5,5-dedecyloxy tetrachlorocyclopentadiene; 5-methoxy pentafluoro or 5,5-dimethoxy tetrafluorocyclopentadiene; haloalkyl halocyclopentadienes, such as 5-chloromethylpentachlorocyclopentadiene; 5,5-bis(chloromethyl)tetrachlorocyclopentadiene; 5-bromoethyl pentabromocyclopentadiene; 5,5-bis(bromohexyl)tetrachlorocyclopentadiene; 5-fluorodecyl pentachlorocyclopentadiene; 5,5-bis(fluorodecyl)-tetrafluorocyclopentadiene.

Some of the styrene compounds that can be used in the Diels-Alder reaction, the product of which is used as a reactant in this invention are styrene or the compounds of the structure

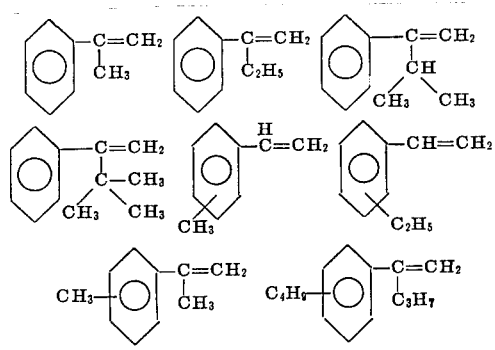

While the present invention is applicable to any bromination apparatus employing bromine and chlorine, the preferred procedure is a multi-reactor process such as that described in U.S. Pat. application Ser. No. 50,602.

The products of the invention can be recovered by normal techniques such as crystallization.

Having described the invention, in general, below are working examples which illustrate embodiments of the invention so that one of ordinary skill in the art may practice the invention.

Unless otherwise indicated, all temperatures are in degrees centigrade and all amount are in parts by weight.

The following examples are comparative examples showing the utilization of various bromination catalysts. Example 1 employs an antimony catalyst while Examples 2 and 3 employ an iron and an aluminum catalyst, respectively.

EXAMPLE 1

Tetrabrominated Adduct of Styrene - Hexachlorocyclopentadiene ($SbCl_3$ Catalyst.)

A solution of 192 g. (1.2 moles) of bromine and 85 g. (1.2 moles) of chlorine in 50 ml. of acetylene tetrachloride (ATC) was added dropwise (during 5 hours) to a stirred solution of 150.8 grams (0.4 mole) of the adduct of styrene and hexachlorocyclopentadiene, 5 g. of antimony trichloride and 120 ml. of acetylene tetrachloride at such a rate that the heat of reaction maintained the reaction temperature at 32°–41C. After stirring an additional hour under ambient conditions, the reaction mixture was slowly heated to 150° until the excess halogenation reagent had been distilled out and then the reaction was allowed to cool to room temperature with stirring. The crystals which precipitated were filtered off and washed with 80 ml. of ATC to give 216 g. (78 percent yield) of white product mp. 170–174 whose analysis was consistant with the desired product. If desired, the product may be steam treated to remove the solvent.

EXAMPLE 11

Tetrabrominated Adduct of Styrene - Hexachlorocyclopentadiene ($FeCl_3$ Catalyst)

A solution of 192 g. (1.2 mole) of bromine and 85 g. (1.2 moles) of chlorine in 50 ml. of acetylene tetrachloride was added dropwise (during 3.5 hours) to a stirred mixture of 150.8 g. (0.4 mole) of the adduct of styrene and hexachlorocyclopentadiene, 5 g. of ferric chloride and 120 ml. of acetylene tetrachloride at such a rate that the heat of reaction maintained the reaction temperature at 36°–43°C. The reaction mixture was allowed to stand under $N_2$ overnight and then was slowly heated to 150° to distill out the excess halogenation reagent. On cooling to room temperature there precipitated 110 g. (40 percent crop yield) of a light grey solid which was contaminated with a black impurity. This was recrystallized twice from benzene after treatments with a decolorizing carbon to give the desired white product.

EXAMPLE 3

Tetrabrominated Adduct of Styrene - Hexachlorocyclopentadiene (Anhydrous $AlCl_3$ Catalyst)

A solution of 192 g. (1.2 mole) of bromine and 85 g. (1.2 moles) of chlorine in 50 ml. of acetylene tetrachloride was added dropwise (during 4.5 hours) to a stirred mixture of 150.8 grams 0.4 mole) of the adduct of styrene and hexachlorocyclopentadiene, 5 grams of anhydrous aluminum chloride 120 ml. of acetylene tetrachloride at such a rate that the heat of reaction maintained the reaction temperature at 33°–40C. The reaction mixture was allowed to stand under $N_2$ overnight and then was slowly heated to 150°C to distill out the excess halogenation reactant. On cooling to room temperature a dark sludge precipitated. The reaction mixture was dissolved in carbon tetrachloride, treated with decolorizing carbon, concentration and allowed to crystallize. The 150 g. of partially crystalling dark sludge which precipitated was recrystallized twice from benzene after treatments with decolorizing carbon to give the white product (57 g. m.p. 173°–177°).

As can be seen from the comparative data, the utilization of an antimony catalyst gives in good yield a white crystalline product which can be used directly in molding compositions. These iron and aluminum catalysts require that the product undergo extensive purification in order to obtain a white product, thus resulting in low yields. In addition, traces of iron were left in the unpurified product obtained with the iron catalyst. As can be seen, the product resulting from the utilization of the iron catalyst was light grey in color with black impurities. These iron impurities would cause degradation of the molding composition and corrosion of the molding equipment at the temperatures normally employed in molding of polymeric materials. The aluminum catalyst resulted in a product which not only had a low yield but was a dark sludge. Significant additional processing steps would be required before the bromophenyl norbornene could be employed in a molding composition.

The brominated styrene halocyclopentadienes produced by this invention are useful as fire retardant additives for various polymers and plastics, especially acrylonitrile-butadiene-styrene (ABS) systems. For other plastics and polymers see Ser. No. 51,008, (now abandoned) filed on even date herewith.

I claim:

1. Process for preparing bromophenyl norbornenes of the structure

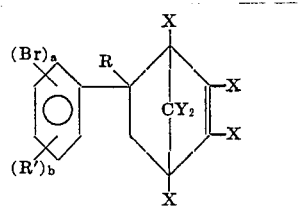

comprising the steps of;
1. reacting, in the liquid phase, a compound of the formula

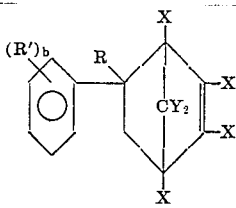

with from about 1 to about 8 moles per mol of said compound of a brominating agent which is a mixture of from about 0.5 to 2.0 molar proportions of bromine and about 1.0 molar proportion of chlorine in the presence of from about 0.01 to about 10.0 percent by weight of said compound of antimony trichloride at a temperature within the range of from about −10°C and about 150°C; and 2. recovering the desired product; wherein X is a halogen independently selected from the group consisting of fluorine, chlorine and bromine; Y is independently selected from the group consisting of alkyl of one to 10 carbon atoms, alkoxy of one to 10 carbon atoms, monohaloalkyl of one to 10 carbon atoms, and halogen, wherein said halo- and said halogen are independently selected from the group consisting of fluorine, chlorine and bromine; R and R' are independently selected from the group consisting of hydrogen and lower alkyl of one to six carbon atoms; and $a$ ranges from about 2 to 4; and $b$ is 0 to 1.

2. The process of claim 1 wherein X is chlorine.
3. The process of claim 1 wherein Y is chlorine.
4. The process of claim 1 wherein R is hydrogen.
5. The process of claim 1 wherein R' is hydrogen.
6. The process of claim 1 wherein the ratio of bromine to chlorine is from about 0.5 to about 1.5 moles of bromine to each mole of chlorine.
7. The process of claim 1 wherein the reaction takes place in the liquid phase.
8. The process of claim 1 wherein X and Y are chlorine and R and R' are hydrogen.
9. The process of claim 1 wherein the reaction is effected in the presence of a solvent which is inert to the reactants and the reaction products.
10. The process of claim 9 wherein the solvent is acetylene tetrachloride.
11. The process of claim 1 wherein the temperature employed in the bromination is within the range of about 0° to 80° centigrade.
12. The process of claim 11 wherein the temperature employed in the bromination is within the range of about 10° to about 40° centigrade.

* * * * *